United States Patent
Griffin et al.

(10) Patent No.: US 11,405,387 B1
(45) Date of Patent: *Aug. 2, 2022

(54) BIOMETRIC ELECTRONIC SIGNATURE AUTHENTICATED KEY EXCHANGE TOKEN

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 447 days.

This patent is subject to a terminal disclaimer.

(21) Appl. No.: 16/509,905

(22) Filed: Jul. 12, 2019

Related U.S. Application Data

(63) Continuation of application No. 15/623,213, filed on Jun. 14, 2017, now Pat. No. 10,469,487, which is a (Continued)

(51) Int. Cl.
*H04L 9/32* (2006.01)
*H04L 9/40* (2022.01)

(52) U.S. Cl.
CPC ........ *H04L 63/0861* (2013.01); *H04L 9/3242* (2013.01); *H04L 9/3247* (2013.01); (Continued)

(58) Field of Classification Search
CPC . H04L 63/083; H04L 63/061; H04L 63/0807; H04L 63/0861; H04L 9/3247; H04L 9/3242; H04L 9/3231; H04L 9/0844
(Continued)

(56) References Cited

U.S. PATENT DOCUMENTS

| | | | | |
|---|---|---|---|---|
| 5,764,789 A | * | 6/1998 | Pare, Jr | G06F 21/83 |
| | | | | 382/115 |
| 7,178,025 B2 | * | 2/2007 | Scheldt | H04L 63/062 |
| | | | | 713/168 |

(Continued)

OTHER PUBLICATIONS

Accredited Standards Committee X9, Incorporated, ANSI X9.73-2010, Cryptographic Message Syntax-ASN.1 and XML, American National Standards Institute, Apr. 15, 2010, 89 pages.
(Continued)

*Primary Examiner* — Samson B Lemma
(74) *Attorney, Agent, or Firm* — Foley & Lardner LLP

(57) ABSTRACT

A method of generating a biometric electronic signature authenticated key exchange ("BESAKE") token. The method begins when a biometric sample captured from a signing party is received. A secret knowledge factor is received. An encryption key is generated using the secret knowledge factor as an input to a password authenticated key exchange protocol. The biometric sample is encrypted with the encryption key. The BESAKE token is generated and includes the encrypted biometric sample and a signing party identifier associated with the secret knowledge factor. The BESAKE token can be verified using a decryption key generated using a stored knowledge factor as an input to the password authenticated key exchange protocol. The secret knowledge factor is retrieved based on the signing party identifier. The identity of the signing party can be authenticated by decrypting the biometric sample from the BESAKE token using the decryption key and matching the decrypted biometric sample.

16 Claims, 4 Drawing Sheets

Related U.S. Application Data continuation-in-part of application No. 15/169,312, filed on May 31, 2016, now Pat. No. 10,154,029.

(52) U.S. Cl.
CPC .......... *H04L 63/061* (2013.01); *H04L 63/083* (2013.01); *H04L 63/0807* (2013.01)

(58) Field of Classification Search
USPC .......................................................... 713/171
See application file for complete search history.

(56) References Cited

U.S. PATENT DOCUMENTS

| | | | |
|---|---|---|---|
| 7,813,822 B1 | 10/2010 | Hoffberg | |
| 8,316,237 B1 | 11/2012 | Felsher et al. | |
| 9,158,906 B2* | 10/2015 | Guajardo Merchan | ...................... H04L 9/0866 |
| 9,692,758 B2* | 6/2017 | Zeljkovic | .............. H04L 9/3234 |
| 10,242,362 B2* | 3/2019 | Burgess | ........... G06Q 20/40145 |
| 10,530,577 B1* | 1/2020 | Pazhoor | ................ H04L 9/3239 |
| 2005/0154924 A1* | 7/2005 | Scheidt | .............. G06Q 20/3674 726/19 |
| 2005/0235148 A1* | 10/2005 | Scheldt | .............. G06Q 20/3829 713/168 |
| 2009/0287837 A1 | 11/2009 | Felsher | |
| 2010/0139667 A1* | 6/2010 | Atkinson | ................ A61F 5/566 128/848 |
| 2010/0235285 A1 | 9/2010 | Hoffberg | |
| 2010/0317420 A1 | 12/2010 | Hoffberg | |
| 2013/0159021 A1 | 6/2013 | Felsher | |
| 2013/0262873 A1* | 10/2013 | Read | ..................... H04W 12/06 713/186 |
| 2014/0258718 A1* | 9/2014 | Isakow | ............... H04L 63/0435 713/165 |
| 2014/0280264 A1* | 9/2014 | Fix | ................... H04N 21/23892 707/756 |
| 2014/0354405 A1* | 12/2014 | Kocher | ................... G06F 21/32 340/5.82 |
| 2015/0215316 A1* | 7/2015 | Zeljkovic | ............ H04L 63/0884 726/6 |
| 2015/0237046 A1* | 8/2015 | Chang | ................. H04L 63/0861 726/7 |
| 2016/0203496 A1 | 7/2016 | Guerrero et al. | |
| 2016/0330027 A1 | 11/2016 | Ebrahimi | |
| 2017/0070497 A1* | 3/2017 | McCallum | ............ H04L 9/3236 |
| 2017/0116615 A1 | 4/2017 | Burgess et al. | |
| 2019/0097812 A1 | 3/2019 | Toth | |

OTHER PUBLICATIONS

Accredited Standards Committee X9, Incorporated, ANSI X9.84-2010, Biometric Information Management and Security for the Financial Services Industry, American National Standards Institute, Mar. 31, 2010, 172 pages.

Griffin, P., Biometric Knowledge Extraction for Multi-Factor Authentication and Key Exchange, Procedia Computer Sciences, vol. 61, Complex Adaptive Systems, Nov. 2-4, 2015, 6 pages.

Griffin, P., Telebiometric Authentication Objects, Procedia Computer Science, vol. 36, Complex Adaptive Systems, Philadephia, PA, Nov. 3-5, 2014, 8 pages.

International Telecommunication Union, Information technology—Open Systems Interconnection—The Directory: Public-key and attribute certificate frameworks, Series X: Data Networks, Open System Communications and Security, Recommendation ITU-T X.509, Oct. 2012, 208 pages.

International Telecommunication Union, Password-authenticated key exchange (PAK) protocol, Series X: Data Networks, Open System Communications and Security, ITU-T Recommendation X.1035, Feb. 2007, 12 pages.

\* cited by examiner

BIOMETRIC ELECTRONIC SIGNATURE AUTHENTICATED KEY EXCHANGE TOKEN

CROSS-REFERENCE TO RELATED APPLICATION

This application is a continuation of U.S. patent application Ser. No. 15/623,213, filed Jun. 14, 2017, which claims priority to U.S. Provisional Patent Application No. 62/439,587 entitled "BIOMETRIC ELECTRONIC SIGNATURE AUTHENTICATED KEY EXCHANGE TOKEN" filed Dec. 28, 2016, and is a Continuation-In-Part of U.S. patent application Ser. No. 15/169,312, filed May 31, 2016, all which are incorporated by reference in their entirety.

BACKGROUND

Access control systems may use one or more authentication factors to verify an individual's identity. For example, authentication factors may include "something-you-know," "something-you-have," and "something-you-are." Some access control systems may require elements from two or three of these categories to provide two- or three-factor authentication.

Biometrics may provide the "something-you-are" factor used for identification and authentication. Biometrics can be coupled with other categories of factors, such as "something-you-have" and "something-you-know," to achieve two- and three-factor authentication when greater assurance is required than a single factor can provide. Biometric traits may include, for example, biological (e.g., fingerprint, iris, hand geometry, etc.) and behavioral (e.g., gait, gesture, keystroke dynamics, etc.) characteristics that reliably distinguish one person from another.

As transactions, interactions, and communications occur over various internet-centric services over personally-owned mobile devices, the actual identities of the parties involved may be unknown. While the internet adds convenience, the identity of the transacting parties is, at times, unknown or unverified. Even authentication systems with username and password login restrictions are susceptible to hacking, password compromise, man-in-the-middle attacks, phishing, or use by an entity that is not the intended authenticating person. Accordingly, protection of personally identifiable information ("PII") needs to be efficient and effective, providing assurance of the identity of the party while not compromising any sensitive information or slowing down information exchange processes with heavy (e.g., processor-intensive) protection mechanisms. Some authentication systems may include the use of an electronic signature ("e-signature"). An e-signature refers to data in electronic form that is associated with a record and is used by a signatory or signing party to sign the record. An e-signature is intended to provide a secure and accurate identification method for the signatory to provide a seamless transaction to a relying party. Definitions of e-signatures vary depending on the applicable jurisdiction. For example, the United States is governed under the Electronic Signatures in Global and National Commerce Act ("ESIGN") and the Government Paperwork Elimination Act ("GPEA"). Under the ESIGN an e-signature is defined as an electronic sound, symbol, or process, attached to or logically associated with a contract or other record and executed or adopted by a person with the intent to sign the record. Additionally under United States federal law, the GPEA further defines the term "electronic signature" to mean a method of signing an electronic message that: (A) identifies and authenticates a particular person as the source of the electronic message; and (B) indicates such person's approval of the information contained in the electronic message. While greater mobility and access to information from anywhere are benefits of using personally-owned mobile devices, there is growing concern and need for data protection as organizations rely on public networks to exchange and access sensitive information, such as biometrics.

SUMMARY

Various embodiments relate to a method of generating a biometric electronic signature authenticated key exchange ("BESAKE") token. The method begins when a biometric sample captured from a signing party is received. A secret knowledge factor is received. An encryption key is generated using the secret knowledge factor as an input to a password authenticated key exchange protocol. The biometric sample is encrypted with the encryption key. The BESAKE token is generated and includes the encrypted biometric sample and a signing party identifier associated with the secret knowledge factor. The BESAKE token can be verified using a decryption key generated using a stored knowledge factor as an input to the password authenticated key exchange protocol. The stored knowledge factor is retrieved based on the signing party identifier. The identity of the signing party can be authenticated by decrypting the encrypted biometric sample from the BESAKE token using the decryption key and matching the decrypted biometric sample with a biometric reference template associated with the signing party identifier.

Various other embodiments relate to a BESAKE token processing system. The system includes a storage location comprising a plurality of biometric reference templates. The system further includes an authentication computing system. The computing system comprises a processor and instructions stored in non-transitory machine-readable media. The instructions configured to cause the computing system to receive a biometric sample captured from a signing party. A secret knowledge factor is received. An encryption key is generated using the secret knowledge factor as an input to a password authenticated key exchange protocol. The biometric sample is encrypted with the encryption key. The BESAKE token is generated and includes the encrypted biometric sample and a signing party identifier associated with the secret knowledge factor. The BESAKE token can be verified using a decryption key generated using a stored knowledge factor as an input to the password authenticated key exchange protocol. The stored knowledge factor is retrieved based on the signing party identifier. The identity of the signing party can be authenticated by decrypting the encrypted biometric sample from the BESAKE token using the decryption key, and matching the decrypted biometric sample with a biometric reference template associated with the signing party identifier.

Various other embodiments relate to a method of verifying a BESAKE token. The method includes receiving a signing party identifier and a BESAKE token from a signing party. The BESAKE token comprises a biometric sample encrypted using an encryption key. The encryption key is generated using a secret knowledge factor as an input to a password authenticated key exchange protocol. A stored knowledge factor associated with the signing party identifier is retrieved. A decryption key is generated using the stored knowledge factor as an input to a password authenticated key exchange protocol. The BESAKE token is decrypted using the decryption key. The biometric sample is matched with a biometric reference template associated with the signing party identifier.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF FIGURES

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
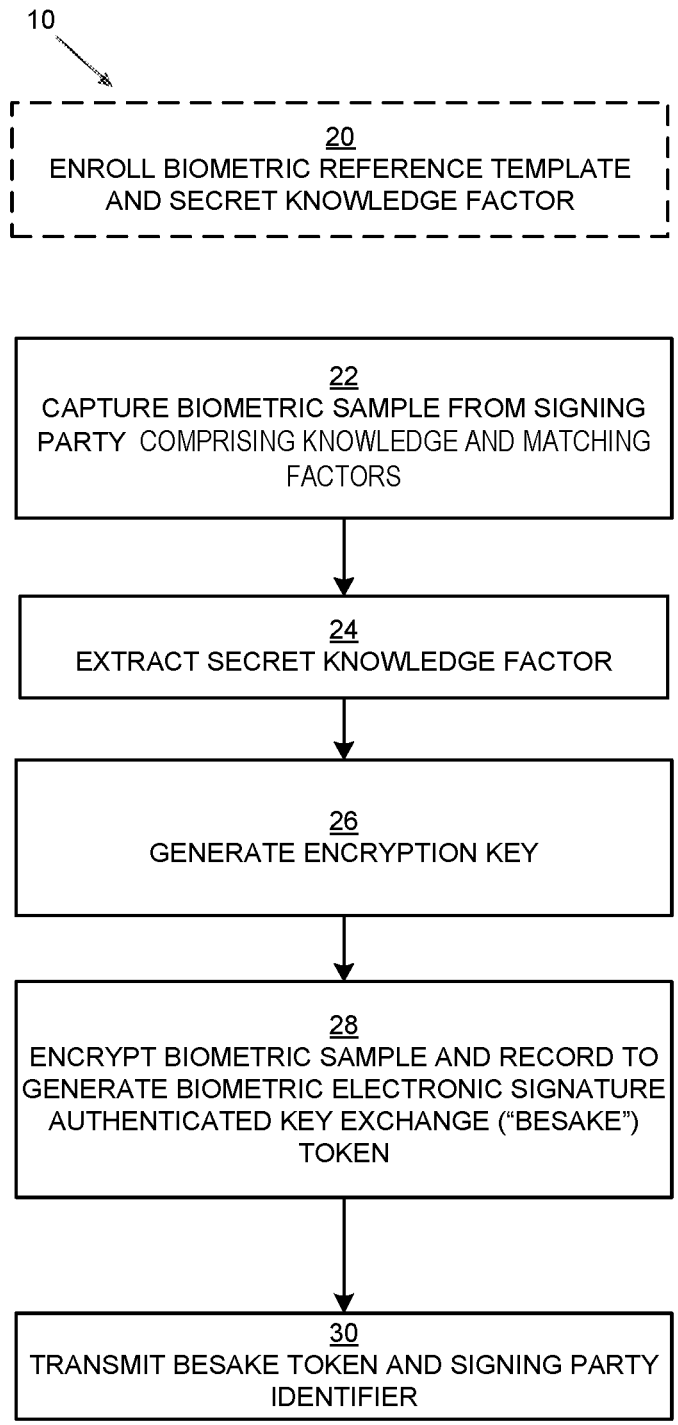
FIG. 1 is a flow diagram illustrating a method of generating a BESAKE token, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Authentication factors for access control systems may include "something-you-know," "something-you-have," and "something-you-are" factors. Access control systems typically collect values for each authentication factor category separately, for example, utilizing a token reader, a keyboard, and a biometric sensor for three-factor authentication. However, binary data collected from biometric sensors can contain rich information content not limited to only the physiological and behavioral characteristics needed to support biometric matching.

Biometric sensor-collected data can contain human knowledge, which may provide the "something-you-know" information used for authentication. Knowledge extraction techniques applied to this data can reveal "weak" secrets expressed by an individual. These secrets are termed weak because they are something a person can easily memorize, such as a passphrase, a password, or a personal identification number ("PIN"). Biometric-based weak secrets may extend these traditional secrets to also include a sequence of footsteps or the finger positions and hand postures used in a gesture (e.g., during communication of hand sign languages when they can be captured and then represented in a canonical form such as a character string).

A password is a "something-you-know" authenticator which may include a string of characters that have an equivalent representation shared by communicating parties. This equivalency makes passwords useful as weak secrets in cryptographic key-agreement schemes, which require both parties to know exactly the same secret in order to establish a shared key to ensure secure communications. Although knowledge extracted from biometric sensors can have this useful equivalency attribute of passwords, often it does not without subsequent processing.

Server authentication mechanisms, such as the widely deployed Transport Layer Security ("TLS") protocol, rely on strong asymmetric cryptography supported by a resource intensive Public Key Infrastructure ("PKI"). However, achieving mutual authentication using TLS is not so common. It is more likely for client authentication to rely on signing party passwords since most users lack the personal digital certificates needed to leverage the mutual authentication option of TLS.

Passwords and other shareable knowledge-based authentication values are typically used for client-side authentication only, with TLS serving to authenticate the server and protect client passwords in transit. Failures in TLS server authentication and signing party errors have led to widespread phishing by attackers impersonating legitimate servers to capture signing party credentials. Consequently, there is a need to provide a strong cryptographic protocol that overcomes the shortcomings of TLS.

Currently, transactions and communications over the internet fail to provide the level of certainty many transactions require. For example, a requesting party may require an intended authenticating party to sign a document by sending it to the authenticating party's known email address. At a later time, the requesting party receives, via email, the document digitally signed with an "/s" signature or similar designation of signature. In this common use case, the requesting party cannot be certain that the actual signer of the document is the intended authenticating person; all that is known is that someone with credentials to access the document and sent it back. However, authentication systems with username and password log in signature setup are susceptible to hacking, password compromising, or use by an entity that is not the intended authenticating person. Currently, an alternative to the alternative to digital "/s" signatures includes the requesting party requiring the authenticating person to print the document, travel to a notary, sign the document in front of the notary, upload the signed document, and transmit the document to the requesting party with the physical signature of the authenticating party and notary stamp. While this method increases the certainty of the identity of the authentication individual, it lacks the efficiency and convenience inherent in internet-based (e.g., online) transactions and communications. Accordingly, there is a need for an authentication-based system for confirming or signing internet-centric interactions that provides greater assurance of identity while maintaining the speed, convenience, and efficiency of internet-centric transactions.

Referring generally to the figures, embodiments described herein relate generally to systems and methods for mutual and multi-factor authentication via a BESAKE processing system for generating and verifying a BESAKE token. Generally, the BESAKE processing system provides multi-factor authentication of a signing party (e.g. an account holder, a user, etc.) for a relying party without the requirement or use of a digital signature or a PKI. The BESAKE token is a biometrics-based electronic signature on a record (e.g., a contract, mortgage, business transaction, etc.) that utilizes the hybrid cryptographic technique of authenticated encryption and an authenticated key exchange to encrypt the information in the BESAKE token. Unlike passwords, biometric matching data is not a shareable authenticator since biometric reference data and biometric matching data are not equivalent.

As will be appreciated, the BESAKE processing system may be used to generate and verify BESAKE tokens in in connection with e-commerce transactions or other types of signing events, such as those involving cloud-based, blockchain-based, distributed ledgers, or smart contract systems, for example. A BESAKE token provides a signing party with the ability to provide a biometric sample from the signing party and a record, both encrypted (e.g. protected) under authentication encryption, thereby providing assurance of the identity of the token (e.g., record and sample) to a relying party through the authenticated key exchange process. A BESAKE token makes use of authenticated encryption to produce a ciphertext (e.g., data that has been transformed by a cryptographic operation to hide its information content). To generate the BESAKE token, the signing party provides a record (e.g., document), a biometric sample, a secret knowledge factor, and a signing party identifier. The secret knowledge factor may be extracted by the BESAKE processing system from the provided biometric sample. In some arrangements, the signing party may provide the secret knowledge factor by entering the secret knowledge factor into a field on a computing device. Subsequently, the BESAKE token may be utilized to authenticate a signing party to facilitate secure, encrypted transactions with the relying party (for example, a financial institution) by extracting knowledge data from the biometric sample provided by the signing party in addition to the biometric matching, thereby accomplishing multi-factor authentication.

According to an embodiment, a signing party can utilize a BESAKE token to provide a biometric-based electronic signature. In some embodiments, the biometric-based electronic signature may be on a document or record. The signing party provides a biometric sample for authentication. The biometric sample contains, and is parsed into, secret knowledge data, such as a "something-you-know" weak secret (e.g., a password), and biometric matching data, such as a "something-you-are" strong secret (e.g., a voice profile, fingerprint, etc.). A symmetric key is created using the extracted secret knowledge data (e.g., using a Password Authenticated Key Exchange Protocol). The symmetric key is used to encrypt the biometric matching data and record to generate a BESAKE token. Some embodiments utilize a key agreement scheme (e.g., key exchange protocol), such as Diffie-Hellman ("D-H"), to create the symmetric encryption key. This key protects the confidentiality of signing party credentials and other message data transferred during operation of the BESAKE protocol. The BESAKE token and a signing party identifier associated with the signing party are then transmitted to an authentication system.

To verify the BESAKE token, the authentication system may match the signing party identifier to a stored knowledge factor and generate a decryption key based on the stored knowledge factor. In some embodiments, the stored knowledge factor is established (e.g., provided by the signing party or assigned to the signing party by the authentication system) when the signing party establishes an account with the authentication system. The stored knowledge factor may also be changed periodically by the signing party. The decryption key may be used to decrypt the BESAKE token and retrieve the biometric matching data and record. The secret knowledge data (e.g. signing party secret) may be extracted from the biometric matching data. The signing party is authenticated with a single authentication factor if the secret knowledge data extracted from the biometric matching data matches the stored knowledge factor. The biometric matching data may also be matched with a biometric reference template associated with the signing party to authenticate the signing party with a second authentication factor. In this regard, the "something-you-are" identification factor is achieved through a biometric authentication process including verification or identification. Verification is the process of comparing a biometric match template against a specific biometric reference template based on a claimed identity (e.g., user ID, account number, etc.). Identification is the process of comparing a submitted biometric sample against some or all enrolled reference templates to determine an individual's identity. In some arrangements, the BESAKE processing system may require that a user first enrolls in a biometric system to generate a biometric reference template that can be used for subsequent biometric matching to verify the user's identity via a biometric sample acquired from the user. In other arrangements, the BESAKE processing system may generate a biometric reference template from the user-provided biometric sample so that the user can be enrolled in a biometric systems for subsequent biometric authentication or identification.

In some arrangements, the BESAKE processing system is used to store a BESAKE token or the components of a BESAKE token in a storage location within a remote procedures call ("RPC") or smart contract code (e.g., the BESAKE token wrapped in executable code or accessible by code) to aid in a transfer of value. When the contract conditions are met, the BESAKE token is transmitted to an individual, an entity, or a location. Expanding generally, a smart contract is code that consists of legal prose, executable code, and parameter(s) that must be achieved to execute the smart contract. The parameters vary by contract instance, such as terms, amounts, dates, etc., and the executable code would be initiated upon achievement of one or more of the parameters (as dictated by the legal contract). Utilizing the BESAKE processing system, a BESAKE token may be wrapped in executable code as part of a smart contract and stored in a distributed ledger, blockchain, or similar storage location. Alternatively, a signing party may provide their biometric sample (with knowledge factor) attached to a record along with an ACCEPT indicator and a signing party indicator. These components are wrapped in executable code and stored in a distributed ledger, blockchain, or similar storage location. When the contract conditions are met, the record and biometric sample are encrypted, generating a BESAKE token. In both arrangements, the BESAKE token can be stored, and subsequently retrieved, on a distributed ledger or blockchain, or the BESAKE token may be transmitted to an entity to complete the contract. For example, using the implementation described above, a signing party sets up a recurring payment (e.g., bill, subscription service, mortgage, etc.) and inserts a BESAKE token (or the components of an BESAKE token) in the payment smart contract stored on a distributed ledger. On the 1st day of each month for 10 years, the smart contract code is initiated such that the BESAKE token is compiled, encrypted, and sent off to the appropriate entity. This process causes a transfer of value from an account of the signing party to the payment recipient's account. Alternatively, this implementation could be used to preauthorize the sale of stock or the purchase of stock on condition that the stock price falls to or below a designated amount.

The BESAKE protocol ensures users (e.g., signing parties) never reveal their knowledge or biometric credentials to imposter recipients or man-in-the-middle observers. D-H key agreement allows two parties to establish a cryptographic key without ever actually exchanging the private value.

According to various embodiments, an authenticator constructed from knowledge extracted from biometric sensor data is used in D-H based Authenticated Key Exchange ("AKE") protocols. The authenticator may serve in place of a password string. According to various embodiments, participants in the exchange represent the knowledge information in a consistent and unambiguous format, such as a canonical encoding based on Abstract Syntax Notation One ("ASN.1"), allowing protocol participants to share precisely the same secret knowledge factor (e.g., signing party password, signing party secret) required to operate the protocol.

The BESAKE processing system provides communicating parties assurance they know each other (e.g., mutual authentication) and aids in establishing a shared secret—a symmetric cryptographic key—for secure communications known only to them for at least the communication involving the BESAKE token. The BESAKE processing system accomplishes signing party authentication implicitly through establishing an authenticated session key. BESAKE utilizes a combined biometrics password through a version of the AKE protocol to provide a stronger, faster alternative to TLS. According to various embodiments, BESAKE may be used to authenticate a signing party (e.g. an account holder at a financial institution) to facilitate secure, encrypted transactions with the financial institution. As will be appreciated, a signing party can provide a multi-factor authentication BESAKE token, containing a signing party biometric sample and a record, seamlessly and quickly over a network instead of the current process of providing a physical signature on a record in tandem with an identity vetting process (e.g., in front of a notary with a state issued license).

The BESAKE processing system provides technical solutions to computer-centric and internet-centric problems associated with conventional biometrics and authentication systems. For example, a BESAKE token, according to various embodiments, provides a more efficient and effective authentication mechanism by providing multi-factor and mutual authentication from a biometrics-based protocol in place of TLS or other server authentication options when a challenge response mechanism is used. The BESAKE processing system protocol is biometrics independent, allowing multiple biometric types to be used to facilitate the mutual authentication. The BESAKE processing system protocol ensures that communicating parties never reveal their knowledge or biometric credentials to imposter recipients or man-in-the-middle observers. Further, the BESAKE processing system provides mutual authentication while avoiding the TLS server-specific authentication errors and signing party errors that have resulted in data breaches and phishing attacks. Additionally, the BESAKE processing system protocol overcomes the TLS and other server authentication systems limitations of mutual authentication procedures being dependent on personal (e.g., on possession of the user) digital certificates. The BESAKE processing system overcomes this limitation by leveraging a signing party password in the BESAKE processing system protocol and providing for a strong, lightweight alternative to TLS and other server authentication systems.

The BESAKE processing system provides technical solutions to computer-centric and internet-centric problems associated with conventional biometrics and authentication systems by providing confidentiality of PII without the use of tokenization or a PKI. By using cryptography that does not require the support of a PKI, the BESAKE processing system reduces the processing power and memory currently required to achieve multi-factor and mutual authentication on resource constrained devices. Additionally, the embodiments herein utilize a strong key exchange mechanism that utilizes a symmetric encryption and decryption method that may be 100 to 10,000 times faster than authentication protocols using asymmetric encryption algorithms while maintaining the same, or greater, protection of the underlying passcode information in the authentication data exchange between the communicating parties. For example, the key exchange mechanism gives protection against objectively weak password strings by relying on knowledge shared by the communicating parties and providing for multi-factor authentication and can provide forward secrecy when fresh random values are used each time the protocol is operated. The encryption provides strong protection without having to dedicate processing power or resources to tokenizing and detokenizing the PII. These problems arise out of the use of computers and the internet because biometric processing and key exchanges cannot exist without the use of computers and the internet. Accordingly, problems relating to authentication between parties communicating over electronic mediums arise out of computers and the internet.

Referring to FIG. 1, a flow diagram of a method 10 of generating a BESAKE token is illustrated, according to an example embodiment. The method 10 is performed to enable the signing party to "sign" a record (e.g., a contract, document, communication, etc.) by binding and encrypting the record with his or her biometric information using an authenticated encryption mechanism. The signing party provides a biometric sample, a record, and a signing party identifier. The BESAKE processing system extracts the secret knowledge factor from the biometric sample and generates the BESAKE token.

At 20, the signing party enrolls a biometric reference template with a biometric service provider ("BSP"). In various embodiments, the signing party enrolls the biometric reference template as a pre-requisite to generating a BESAKE token. Enrollment is completed when the generated biometric reference template is associated with a signing party identifier unique to the signing party. Generally, the enrollment process includes the user (e.g., signing party) providing a plurality of biometric samples. In some embodiments, the initial biometric sample is taken at the relying party's location using a biometric sensor. In other embodiments, the user must have their plurality of initial biometric samples taken at an establishment managed by a BSP. However, in other embodiments, the initial biometric sample is taken on the signing party's computing system, for example on a mobile device. The biometric sample may be, for example, a finger print, a retina scan, a voice profile, etc. Additionally, the signing party establishes a secret knowledge factor with a relying party or the BSP. The secret knowledge factor is the "something-you-know" used to generate the symmetric key by the signing party to encrypt the content in the BESAKE token (and subsequently used by a relying party to decrypt content in the BESAKE token). For example, the secret knowledge factor could be a password string of "password 123." In some arrangements, the secret knowledge factor is shared using an encrypted, secure connection via a network. The biometric reference template and the signing party secret factor (stored as a "stored knowledge factor" herein) are stored with the signing party identifier for future authentication instances.

At 22, a biometric sample is captured from the signing party. The biometric sample includes knowledge and matching factors. In other words, the secret knowledge factor is provided within the biometric sample. For example, the signing party's biometric sample could be a voice sample of the signing party speaking a biometric access phrase of "My password is password 123." In this instance, the knowledge factor would be the extracted "password 123," which matches the signing party's secret knowledge factor, and the matching factor would be the voice sample that matches the voice signature in the signing party's biometric template. The sample could be captured using a biometric sensor or similar device (e.g., using a microphone on a mobile computing device). In some arrangements, the captured biometric sample is first transmitted to a BSP to be processed into biometric data.

At 24, the signing party knowledge factor is extracted from the biometric sample. For example, if the captured biometric sample was a finger print with finger gestures, the finger gestures would be parsed out to determine the "gestured" (e.g., a pattern, touching the sensor in particular locations, etc.) movements to extract the secret knowledge factor. In some arrangements, the BESAKE processing system may require the signing party to provide the secret knowledge factor manually, for example typing in the passcode to a computing device keyboard, in addition to providing it in the biometric sample.

At 26, a symmetric key is created using the secret knowledge factor via an agreed-upon encryption algorithm. The encryption algorithm can be, for example, the D-H protocol or other password authenticated key ("PAK") exchange protocols. In some arrangements, the PAK protocol is ITU-T Recommendation X.1035 (2007). The PAK used may comply with the standards outlined in the ISO/IEC 11770-4 standard. As discussed previously, both parties must have pre-established the shared secret that will be used by both parties to generate the same keys.

While not shown, in some arrangements, a time stamp token ("TST") may be requested from a time stamp authority ("TSA"). In some embodiments, the TST is requested by generating a hash of the record and the biometric sample, which is used as an input to a trusted time stamp process. For example, in one embodiment, the hash is transmitted to the TSA which cryptographically binds the hash to a time stamp to generate the TST. The TST can be subsequently included in the encryption algorithm as the plaintext along with the record and biometric sample provided along with a BESAKE token or used in place of the record and biometric sample in the encryption algorithm. In other arrangements, a non-trusted time stamp (e.g., local to the signing party computing system) may be included. As the TST provided by the TSA is already cryptographically protected as a signed object, in some arrangements, it is in the unprotectedAttrs component of a BESAKE token that is generated using the NamedKeyEncryptedData message type of the X9.73 CMS-ASN.1 and XML standard.

At 28, the biometric sample and record are encrypted using the symmetric key generated at 26. The BESAKE token, including the encrypted biometric sample and record, is generated. The process includes the use of an encryption algorithm associated with the authenticated encryption mechanism. The input for the encryption algorithm of the BESAKE token includes plaintext content (including at least the biometric sample and record) and the secret knowledge factor (either manually entered, extracted from the biometric sample, or both). The plaintext content includes the biometric sample to provide the "something-you-are" authentication factor and the record to provide the transaction or interaction information. In some arrangements, additional attributes can be included in the input. For example, in one implementation, a message signer wants to withdraw funds from an ATM. To validate the withdrawal, the BESAKE token can include signed attributes, such as a financial institution identifier, an account number, a customer account number, a BSP identifier, and an ATM generated time stamp.

In some arrangements, the plaintext content may include a hash of the record, a hash of the biometric sample, or a hash of the record and biometric sample in place of the actual record and biometric sample. For example, the BESAKE token is generated using only a hash of the record. In some arrangements, the record is appended to or included with the biometric sample to further associate the record and the biometric sample. For example, the plaintext could include a loan agreement and the signer's biometric sample, thereby providing greater assurance to a relying party on the identity of the signing party and providing an indication of acceptance of the record than traditional digital signature methods alone.

In other arrangements, the plaintext content may include a Uniform Resource Identifier ("URI"), which is a string of characters used to identify a source. Such identification enables interaction with representations of the resource over a network, such as the internet of things, using specific protocols. Schemes specifying a concrete syntax and associated protocols define each URI. The most common form of URI is a Uniform Resource Locator ("URL"). The URI can be used in the BESAKE processing system in place of the record that is being signed. For example, a URI to the document that was being signed and a hash of that document could be used in the plaintext content (in addition to the biometric sample). This use would allow a relying party to use the decrypted URI to identify the record location, and the hash of the record would ensure that the record at the record location has not been altered (e.g., if the record at the record location is unaltered it will generate the same hash as found in the BESAKE token). Therefore, if the document at the URI were to change, even by one character, an authentication system would be able to detect that it's not the document the signing party intended to sign.

In some arrangements, the BESAKE token is structured using CMS type NamedKeyEncryptedData, which is a cryptographic message syntax defined in the X9.73 CMS—ASN.1 and XML standard. NamedKeyEncryptedData allows for the use of the "keyName" component to provide the additional signing party identifier information within the BESAKE token. in some embodiments, the keyName component of type NamedKeyEncryptedData is defined as a value of Abstract Syntax Notation One ("ASN.1") type OCTET STRING, which is an opaque string that could contain any type or format of data. However, when a keyName value is used to generate a BESAKE token, the symmetric key is identified indirectly using an account identifier or login of the signing party. The keyName component is any public value since the actual "key name" (e.g., what is used to generate the symmetric key) is the secret knowledge factor (e.g., a pass phrase or password that must not be revealed to an attacker). The key name could be a string that represents an account number or login with the relying party, for example, "John J. Smith." If this key name needed to be globally unique, for example for use in an ecommerce setting, it could be represented as a fully qualified account name, such as "http://www.relying party.com/JohnJSmith." This value would provide sufficient information to allow an authentication system of the relying party to determine the value of the signing party's previously stored password. That value could be used in a D-H agreement scheme to derive the symmetric key needed to recover the plain text value from the encrypted cipher text in an encryptedContentInfo component of the NamedKeyEncryptedData message. An example XML mark-up includes:

NamedKeyEncryptedData::=SEQUENCE {
   version CMSVersion,
   keyName, [0] OCTET STRING OPTIONAL,
   encryptedContentInfo EncryptedContentInfo,
   unprotectedAttrs [1] UnprotectedAttributes OPTIONAL
}

As will be appreciated, a BESAKE token generated using the NamedKeyEncryptedData message includes a plaintext to be encrypted of: a biometric sample, an optional time and date string, and an optional challenge-response.

At 30, the generated BESAKE token is transmitted to a relying party along with a signing party identifier. In some arrangements, the signing party identifier is included within the BESAKE token. The signing party identifier represents an account login, user name, or similar identifier recognizable by the relying party to be associated with the secret knowledge factor. The signing party identifier allows the relying party to retrieve the previously enrolled signing party secret as the stored knowledge factor.

In some arrangements, a challenge question may be included along with the BESAKE token, at 30, or within the plaintext used to generate the BESAKE token, at 28. The challenge question requires a response from the relying party; if the relying party responds appropriately, the signing party may mutually authenticate the relying party. Additionally, the challenge question provides protection against man-in-the-middle or phishing attacks because an unauthorized source would lack the credentials and knowledge to respond appropriately to the challenge question.

In some arrangements, the BESAKE token may include a possession identifier, at 30. In some arrangements, the possession identifier is included within the generated BESAKE token and protected by encryption. The possession object identifiers are associated with the signing party identifier to confirm a "something-you-have." The possession object identifiers, being the "something-you-have factor," could be a key fob, a MAC address for a computing device, a coordinate location pairing, etc. In order to be authenticated, the signing party associated with the signing party identifier would have to possess the object identifier when providing the biometric sample. For example, the BESAKE token would fail to generate (or fail a validation attempt by a relying party) if the provided biometric sample was extracted from a biometric sensor with the physical address "ABC" but the signing party identifier only enrolled a possession object identifier for biometric samples to be submitted from a biometric sensor with the physical address of "EFG." In some arrangements, the signing party has a fob that is the possession object identifier associated with the signing party identifier. While the biometric sample is captured, the signing party provides the value contained in the fob (e.g., the "something-you-have" factor), the value related to the biometric sample that includes a biometric message (e.g., the "something-you-know" factor), and biometric characteristics (e.g., the "something-you-are" factor).

As will be appreciated, the method 10 is transparent to the signing party and is easy to use. From the signing party's point of view, the signing party has to provide only a record and biometric sample containing the signing party secret knowledge factor to generate a BESAKE token. For example, the signing party receives a loan agreement from a financial institution at which the signing party is an account holder, and at which the signing party has previously enrolled a biometric voice profile including the secret knowledge factor. The signing party interacts with the BESAKE processing system (e.g., accesses an application on computing device) and identifies the loan agreement as the document. The signing party speaks the secret knowledge factor, for example "My password is password123," into a biometric sensor in communication with the BESAKE processing system. The BESAKE processing system captures the biometric sample, extracts the secret knowledge factor from the biometric sample, generates the symmetric key, encrypts the record and biometric sample, and generates the BESAKE token. Accordingly, to generate the BESAKE token, the signing party need only remember the password/passphrase.

Figure 2:
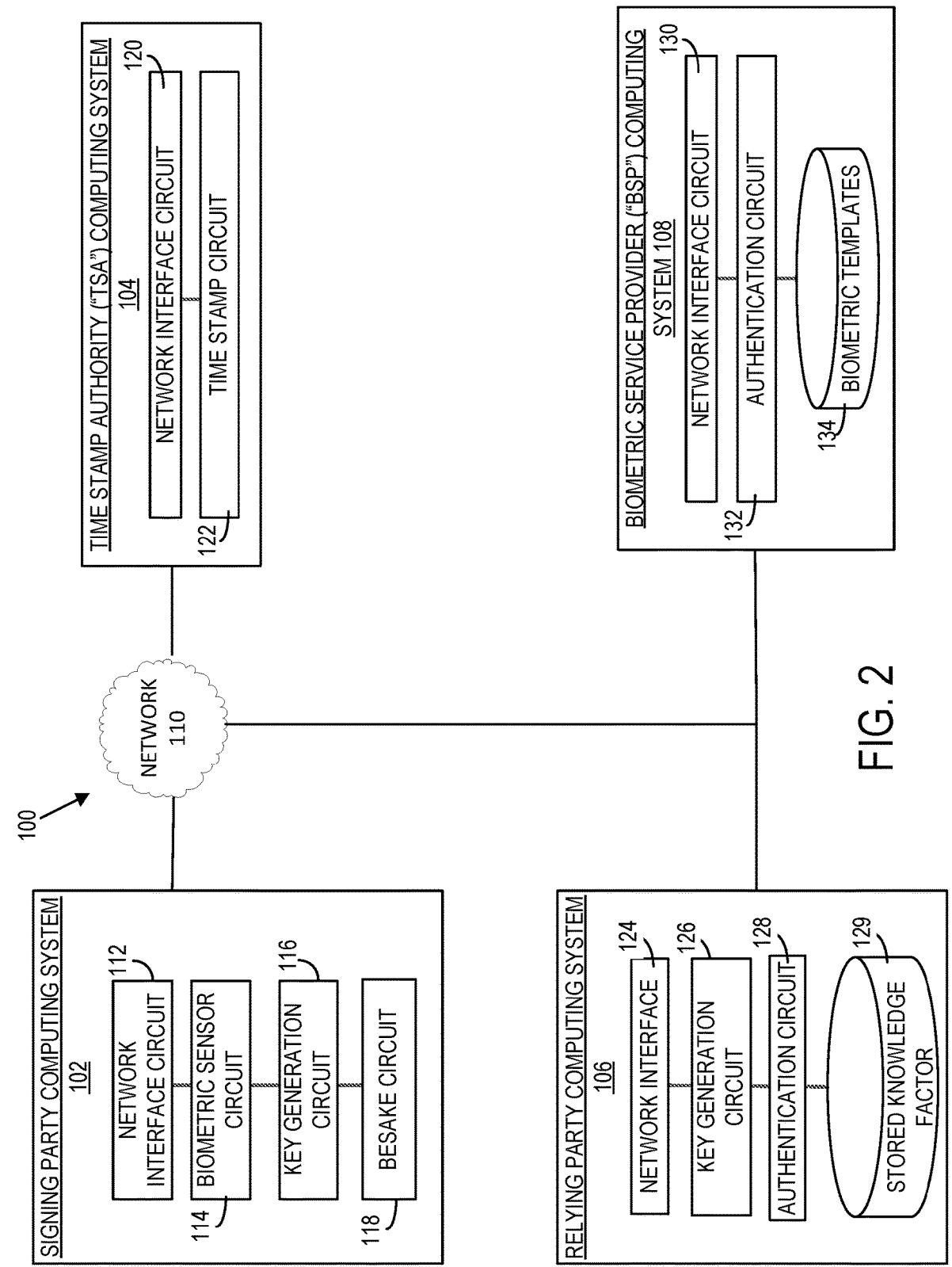
FIG. 2 is a schematic diagram of a BESAKE token processing system, according to an example embodiment

FIG. 2 is schematic diagram of a BESAKE processing system 100 generating and validating BESAKE tokens, according to an example embodiment. The BESAKE processing system 100 includes a signing party computing system 102, a TSA computing system 104, a relying party computing system 106, and a BSP computing system 108. Each of the signing party computing system 102, the TSA computing system 104, the relying party computing system 106, and the BSP computing system 108 is in operative communication with the others via a network 110. The mechanisms allow for the generation and verification of the identity of a signer of an electronic message via a biometric sample and secret knowledge factor. Specifically, the BESAKE processing system 100 makes it possible for the identity of the signer to be verified by a relying party (e.g., merchant, financial institution, service provider, etc.) by encrypting a biometric sample, additional content, and attributes that facilitate the verification of the message signer (e.g., signing party, user, customer, etc.). The network 110 may include, for example, the internet, cellular networks, proprietary cloud networks, telebiometric objects on the internet of things, and the like.

Generally, customers may use the BESAKE processing system 100 to extract knowledge from a biometric sensor and provide varying levels of authentication data to a relying party. The BESAKE processing system 100 allows for a biometric-based protocol for PAK exchange to be used wherein the system relies on a knowledge factor shared by the communicating parties that is extracted from data collected by biometric sensors. BESAKE uses similar processing as international standards but allows the use of more general, pre-shared "something-you-know" biometric knowledge in both client-side and server-side authentication.

The signing party computing system 102 includes a network interface circuit 112, a biometric sensor circuit 114, a key generation circuit 116, and a BESAKE circuit 118. The network interface circuit 112 is structured to facilitate operative communication between the signing party computing system 102 and other systems and devices over the network 110. The signing party computing system 102 may include smartphones, tablet computing systems, laptop computing systems, desktop computing systems, PDAs, smart watches, smart glasses, tablets, etc.

The biometric sensor 114 is structured to capture biometric data. For example, the sensor can be structured to read a fingerprint, voice print, or other biometric marker. Generally, the biometric sensor 114 is any technology type that supports the capture of biometric data. In one embodiment, the biometric sensor is connected to a floor pad operably connected to the signing party computing system 102 by collecting both the walking and stepping patterns from the walking samples for biometric matching using a two-dimensional biometric sensor grid. The order and identities of tiles encountered as participants traverse the grid could convey signing party knowledge through a stepping pattern. A series of identifiers mapped to user-selected tiles forming a memorized stepping pattern could serve as the customer's "something-you-know" factor. In some arrangements, the raw biometric data captured by the biometric sensor 114 is processed by a BSP to generate a biometric reference template. In some arrangements, a plurality of biometric samples captured from an individual are processed to create the biometric reference template.

The key generation circuit 116 is structured to derive a cryptographic key using an agreed-upon encryption algorithm (e.g., encryption protocol), for example the D-H protocol, other commutative encryption algorithms, etc. The key generation circuit 116 derives a cryptographic key based on the secret knowledge factor. Both parties must have pre-established the protocol operation, as well as shared knowledge of the password both parties will use with the commutative encryption algorithm protocol to generate encryption and decryption keys used to encrypt and decrypt data in the BESAKE token. In some arrangements, the key generation circuit 116 extracts the signing party knowledge factor from the biometric sample captured by the biometric sensor circuit 116. In other arrangements, the signing party knowledge factor is provided by the BESAKE circuit 118.

The BESAKE circuit 118 is structured to generate a BESAKE token by extracting the signing party knowledge factor from the biometric sample and encrypting a record and the biometric sample with the symmetric key generated by the key generation circuit 116. In some arrangements, the BESAKE token further includes an identifier of a registered object (e.g., unique RFID, a telebiometric authentication identifier, etc.), allowing an additional "something-you-have" authentication layer. An example method of generating a BESAKE token is described in greater detail above in method 10 of FIG. 1.

The TSA computing system 104 includes a network interface circuit 120 and a time stamp circuit 122. The TSA computing system 104 is managed by any trusted time authority that can provide a TST for a piece of information. The trusted time authority can be one that complies with the X9.95 standard, or those defined in similar standards by ISO/IEC/IETF, and satisfies legal and regulatory requirements. In some embodiments, the TSA computing system 104 may be contained in, and controlled by, the TSA computing system 104 or the BSP computing system 108. The network interface circuit 120 is structured to facilitate operative communication between the TSA computing system 104 and the signing party computing system 102 over the network 110. The time stamp circuit 122 is structured to negotiate a trusted TST, which includes receiving a hash of a piece of information and generating a trusted TST for the information for future verification. In some arrangements, the TST is generated inter-device (e.g., capturing the system time, or mobile phone time), and the TST is included in the plaintext that is encrypted in the BESAKE token. In other arrangements, the TST is includes along with the BESAKE token as an unencrypted attribute.

The BSP computing system 108 includes a network interface circuit 130, an authentication circuit 132, and a biometric reference template database 134. The network interface circuit 130 is structured to facilitate operative communication between the BSP computing system 108 and other systems and devices over the network 110. Generally, the BSP computing system 108 stores biometric reference templates for signing parties and handles biometric matching requests from relying parties. Before using the BESAKE processing system 100, the signing party must have enrolled with the BSP and created a biometric reference template. In some embodiments, the biometric sample may only be transmitted by an employee of the BSP entering the data into a computing system (e.g., an employee terminal connected to the server of the BSP) during a person-to-person interaction. For example, the customer may walk into a branch location of the BSP and initiate the enrollment process via interaction with a teller. In other arrangements, the BESAKE token processing system may create a biometric reference template from the user-provided biometric sample so that the user can be enrolled in a biometric systems for subsequent biometric authentication or identification.

The biometric reference template database 134 includes a plurality of signing party identifiers and corresponding biometric reference templates that are a byproduct of customers enrolling in the biometric service. The signing party identifier can be, for example, a signing party name, email address, phone number, or the actual name of the customer. The signing party identifier may be stored in the attributes or fields of a BESAKE token.

The authentication circuit 132 is structured to receive a biometric sample and an authentication request from the relying party computing system 106 over the network 110 and compare the received sample to a stored reference template. The authentication request includes a request for verification and/or identification. If the sample matches the reference template, the authentication circuit 132 transmits a positive authentication value to the relying party computing system 106. In some arrangements, the authentication circuit 132 will provide a negative matching value (e.g., indicator) if there is no matching signing party identifier in the biometric reference template database 134 or if the signing party does not have a biometric reference template for the biometric type of the biometric sample.

The relying party computing system 106 includes a network interface circuit 124, a key generation circuit 126, an authentication circuit 128, and a stored knowledge factor database 129. Generally, the relying party computing system 106 receives a BESAKE token from the signing party computing system 102 and verifies the identity of the message signer. With the received BESAKE token, the relying party computing system 106 is also able to verify data integrity and origin authenticity of the content within the BESAKE token and the BESAKE token as a whole. Specifically, if the biometric sample and biometric reference template produce a positive match value and the digital signature is verified, the relying party can trust the data integrity and origin authentication. Origin authenticity is achieved if the same symmetric key associated the secret knowledge factor is generated and matches the knowledge factor extracted from the biometric sample. The network interface circuit 124 is structured to facilitate operative communication between the relying party computing system 106 and other systems and devices over the network 110.

The key generation circuit 126 is structured to derive a cryptographic key using an agreed-upon encryption algorithm (or encryption protocol), for example the D-H protocol, other commutative encryption algorithms, etc. The key generation circuit 126 derives a decryption key based on the stored knowledge factor. Upon receipt of the BESAKE token, the relying party computing system 106 extracts a signing party identifier associated with a stored knowledge factor in the database 129. The key generation circuit 126 retrieves the stored knowledge factor from the database 129 and uses it to generate the symmetric key and decrypt the message. For example, upon receiving the signing party identifier of "John Smith" (e.g., John Smith's username, email address, customer number, Social Security Number, driver's license number, etc.), the key generation circuit 126 will look for John Smith's account in the signing party secret database 129 and retrieve the stored knowledge factor.

The authentication circuit 128 is structured to facilitate the authentication of the biometric sample in a BESAKE token with a biometric reference template stored on the BSP computing system 108. For example, upon receiving a BESAKE token, the relying party computing system 106 automatically begins verification of the signature, unencrypts a BESAKE token, and transfers the captured biometric sample to the BSP computing system 108 for matching. The biometric sample can be in the form of a simple oblique value (a string of octets) or structured content that contains the biometric data value and any information needed to recover the plaintext, such as the URL address of a biometric service provider or web service, an indication of the specific biometric processing technique that was used, or any other required data or authentication information. In some arrangements, the attribute of the digital signature message may be cryptographically bound to a hash of the biometric sample. In some embodiments, the decrypted biometric sample may include a biometric access phrase in addition to the secret knowledge factor. For example, the signing party can provide a biometric access phrase of "I use my voice to log on now brown cow" which provides a biometric sample that includes a biometric access phrase ("I use my voice to log on") and a secret knowledge factor ("now brown cow"). The authentication circuit 128 may be structured to parse the biometric access phrase and the secret knowledge factor. In some embodiments, authentication by the authentication circuit 128 is triggered when the biometric access phrase is detected or the BESAKE token is decrypted. An example method 300 of verifying a BESAKE token is discussed below in FIG. 3.

Figure 3:
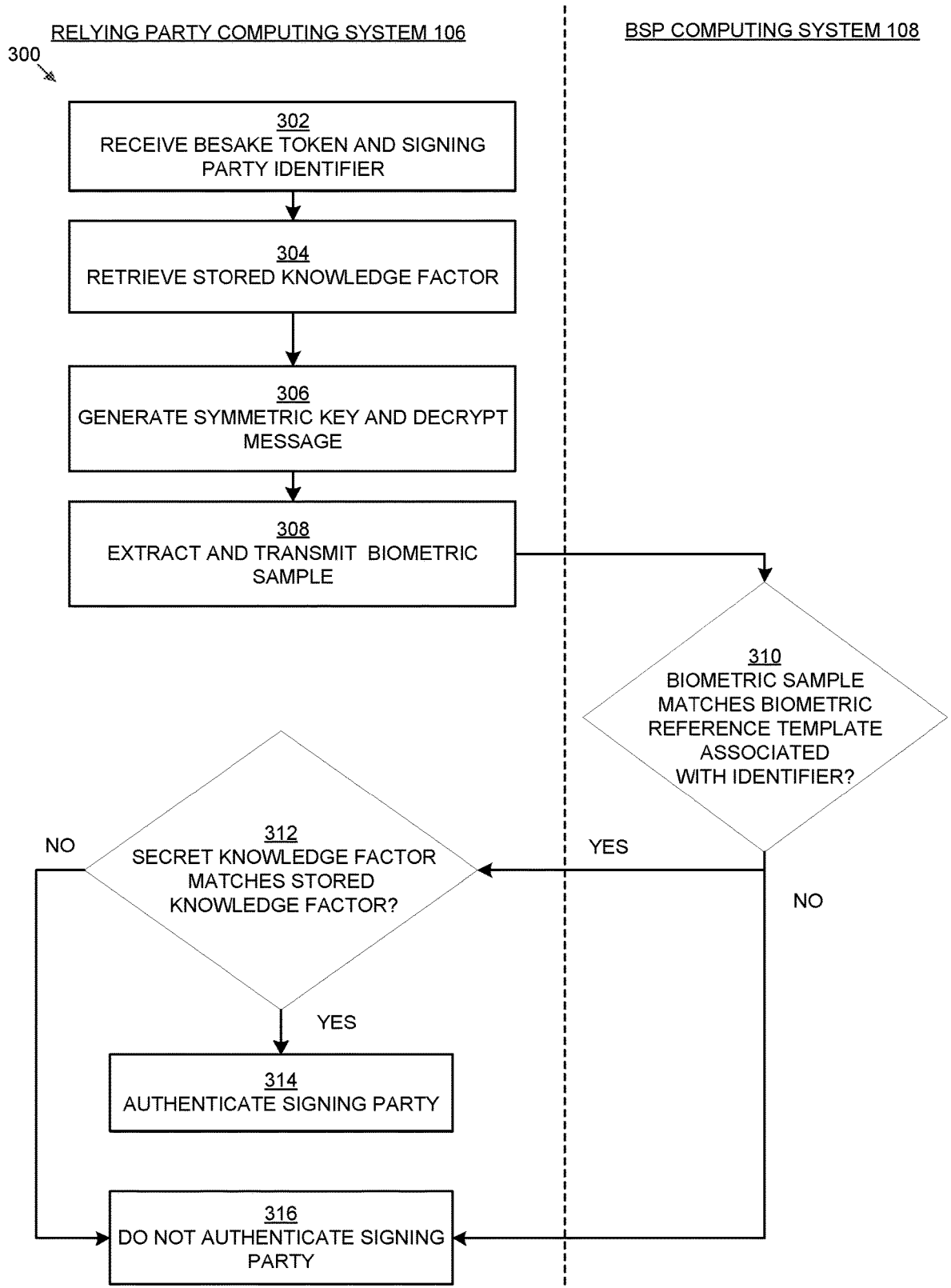
FIG. 3 is a flow diagram illustrating a method of validating a BESAKE token, according to an example embodiment.

Referring to FIG. 3, a flow diagram of a method 300 of validating a BESAKE token is illustrated, according to an example embodiment. The method 300 is described in connection with a relying party (e.g., message recipient) and a BSP. According to various embodiments, the relying party is an entity that manages the relying party computing system 106 of FIG. 2, and the BSP is an entity that manages the BSP computing system 108 of FIG. 3. However, the method 300 may be similarly performed by other systems and devices. The method 300 includes receiving a BESAKE token that provides the relying party with all information needed to verify the biometric information of a signing party included in the BESAKE token. The BESAKE token can subsequently be used to provide two-factor authentication via a "something-you-have" factor in the form of the secret knowledge factor and a "something-you-are" factor in the form of the user's biometric sample. In some arrangements, a relaying party (e.g., middle party, merchant, etc.) that does not require the biometric matching capability but is able to verify the encryption on the BESAKE token and trust in some of the BESAKE token content transmits the BESAKE token from the signing party to the relying party. The relaying party may transmit the BESAKE token to the relying party computing system 106. For example, the relaying party may be a merchant that receives the BESAKE token from a credit card holder (e.g., message signer) and transmits the charge information to the relying party (e.g., payment card issuer).

The method 300 begins when the relying party computing system 106 receives a BESAKE token, at 302. At 304, the relying party computing system 106 uses the signing party identifier in the BESAKE token to retrieve the stored biometric reference template and the stored knowledge factor for the signing party. In some embodiments, after receiving the message, at 304, the relying party determines if the requesting signing party is registered with the relying party and has a biometric reference template on file with the BSP computing system 108. If the requestor is not registered, the relying party may deny the authentication request. In other embodiments where no biometric enrollment has occurred, the relying party may require the signing party to provide another biometric sample in person to authenticate the message. An example method 400 of verifying a BESAKE token without prior biometric enrollment is discussed below in FIG. 4.

At 306, the relying party uses the stored knowledge factor to generate a symmetric key using the agreed-upon commutative encryption algorithm. Using the protocol and the stored knowledge factor, a cryptographic key is derived. The generated key is used to decrypt the BESAKE token via the same encryption algorithm that was used by the signing party to encrypt the BESKAE token.

At 308, the relying party computing system 106 extracts the secret knowledge factor and biometric sample and transmits a biometric match request to the BSP computing system 108. The biometric match request includes the biometric sample and the signing party identifier. Alternatively, the request, at 308, could be for an identification. Identification is the process of comparing a submitted biometric sample against some or all enrolled reference templates to determine an individual's identity. Identification is a "one-to-many" comparison that entails the comparison of a match template generated from a newly captured sample with all of the templates in the database. It is most often used to determine whether or not a person has previously enrolled in the system. It should be understood that embodiments described herein are not limited to providing biometric authentication of a message signer and content. Instead, the embodiments described herein may similarly be performed on other types of systems using other types of data.

At 310, the BSP computing system 108 determines whether the biometric sample matches the biometric reference template associated with the signing party identifier. The BSP computing system 108 generates and transmits a match value to the relying party computing system 106. For example, the match value is a binary value indicating a match or a non-match. The comparison uses a biometric processing algorithm or a biometric matching algorithm. If the sample matches the reference template, then a positive authentication value is transmitted to the relying party computing system 106 at 312. In some arrangements, the BSP may send a Security Assertion Markup Language ("SAML") assertion of the match value. In those arrangements, a time value or time limit may be included with the SAML assertion. If the sample does not match the reference template, then a negative authentication value is transmitted to the relying party computing system 106 at 316. In some arrangements, the relying party may authenticate the party if the secret knowledge factor extracted from the biometric sample matches the stored knowledge factor.

At 312, the relying party computing system 106 receives the positive match value from the BSP computing system 108 and may decide to determine if the secret knowledge factor extracted from the biometric sample matches the stored knowledge factor. If the factors match, the relying party authenticates the signing party at 314. If the factors do not match, the relying party does not authenticate the signing party at 316. In some arrangements, the relying party may still authenticate the signing party even if the secret knowledge factor extracted from the biometric sample does not match the stored knowledge factor, as the biometric samples matching would be indicative of the proper decryption key being used to decrypt the biometric sample from the BESAKE token. In some arrangements, if the biometric knowledge factors match but the secret knowledge factors do not match, the relying party will deny the authentication request and may allow the requestor to resubmit the secret knowledge factor without having to redo the biometric sample. In other arrangements, the relying party does not check the stored knowledge factor from the secret knowledge factor extracted from the biometric sample.

At 314, the relying party authenticates the signing party. In some arrangements that include a TST, the relying party can also verify a TST associated with a BESAKE token by completing a "hash check" with the information. This process includes generating a hash of the original data, appending the timestamp given by the TSA, and calculating the hash of the result (e.g., the hash of the original data with the appended time stamp). In some embodiments, the relying party also matches a possession object identifier included with the biometric sample to a stored possession object identifier associated with the signing party's signing party identifier.

Figure 4:
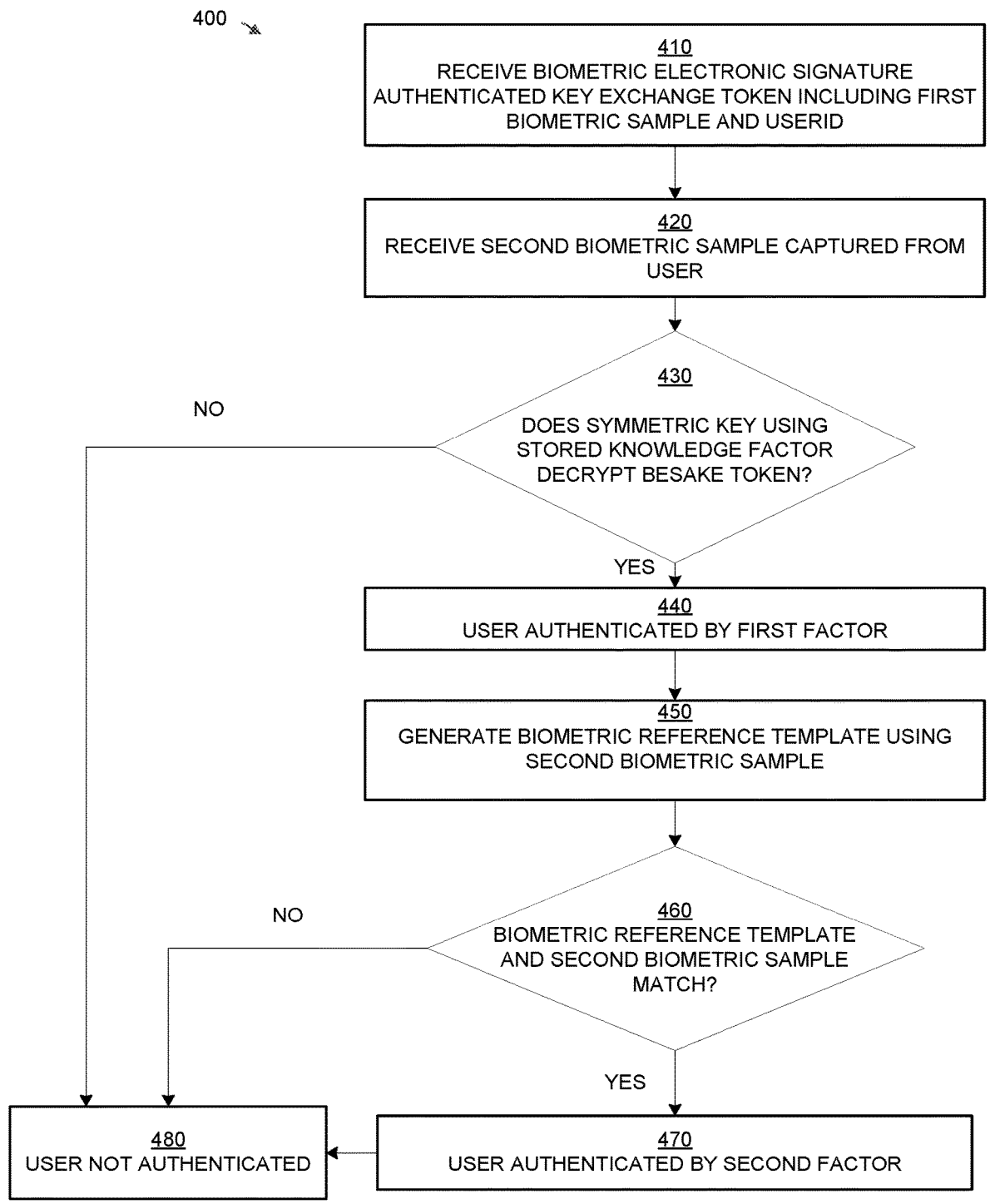
FIG. 4 is a flow diagram illustrating a method of verifying the identity of a signing party without signing party previously enrolling with a biometric service provider, according to an example embodiment.

FIG. 4 is a flow diagram illustrating a method 400 of verifying the identity of a signing party that has generated a BESAKE token without the signing party previously enrolling with a BSP, according to an example embodiment. According to various embodiments, the method 400 may be performed by an independent third party to authenticate the user purporting to have biometrically signed the BESAKE token using a second biometric sample captured from the user. This provides a first authentication factor that the user is the signing party. In some embodiments, the method 400 includes authenticating the user via a second authentication factor by verifying that the secret knowledge factor extracted from the first biometric sample and used to generate the BESAKE token matches the stored knowledge factor in the relying party's database.

At 410, a BESAKE token is received. According to various embodiments, the BESAKE token comprises a token including a first biometric sample captured from a signing party, a record, and a signing party identifier.

At 420, a second biometric sample is received. The second biometric sample has been captured from a user purporting to be the signing party that biometrically signed the BESAKE token with the first biometric sample captured from the signing party.

At 430, the stored knowledge factor associated with the signing party identifier in the BESAKE token is used to decrypt the BESAKE token and extract the biometric sample. If the decryption fails, then the BESAKE token was not encrypted using the same secret knowledge factor as stored in the relying party database and the user is not authenticated at 480. If the decryption is successful, then the user is authenticated by a first authentication factor at 440.

At 450, a biometric reference template is generated based on biometric characteristics extracted from the second biometric sample. In some arrangements, the generation of the biometric reference template can be done by an another party, for example a BSP.

At 460, it is determined whether the biometric reference template generated at 430 using the second biometric sample is matched against the first biometric sample in the BESAKE token. In some arrangements, a biometric matching service it utilized to complete the match. If the result of 460 is "YES" and the biometric reference template and the first biometric sample match, then the user is authenticated by a second authentication factor at 470. This verifies that the user is the signing party. If the result of 460 is "NO" and the biometric reference template and the first biometric sample do not match, then the user is not authenticated at 480. According to various embodiments, authentication may be performed using either of 430 or 460, alone or in combination.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, camera, microphone, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like. Any foregoing references to blockchains or repositories are intended to include any distributed ledgers. Examples of distributed ledgers include R3CEV Corda, Hyperledger, Ethereum, and the like.

It should be noted that, although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A system for verifying a biometric electronic signature authenticated key exchange ("BESAKE") token comprising:
 a storage location comprising a plurality of biometric reference templates;
 a second storage location comprising a plurality of secret knowledge factors;
 an authentication computing system, comprising a processor and instructions stored in non-transitory machine-readable media, the instructions configured to cause the authentication computing system to:
 receive a signing party identifier and the BESAKE token from a signing party, the BESAKE token comprising a biometric sample encrypted using an encryption key and an object identifier;
 matching the object identifier with a stored object identifier associated with the signing party identifier;
 retrieve a stored knowledge factor associated with the signing party identifier from plurality of secret knowledge factors of the second storage location;
 generate a decryption key using the stored knowledge factor as an input to a password authenticated key exchange protocol;

decrypt the encrypted biometric sample from the BESAKE token using the decryption key to retrieve a biometric sample; and match the biometric sample with a biometric reference template associated with the signing party identifier, wherein the object identifier is associated with a physical object used to capture the biometric sample.

2. The system of claim 1, the instructions configured to further cause the authentication computing system to:

receive at least one biometric reference sample and the secret knowledge factor during an enrollment procedure; and generate the biometric reference template using the at least one biometric reference sample.

3. The system of claim 2, wherein the secret knowledge factor received during the enrollment procedure includes a plaintext password.

4. The system of claim 1, the instructions configured to further cause the authentication computing system to:

transmit to a biometric service provider computing system, a match request, the match request including the signing party identifier and the biometric sample; and receive from the biometric service provider computing system a binary match value, the binary match value relating to a result, determined by the biometric service provider computing system, of matching the biometric sample with the biometric reference template associated with the signing party identifier, wherein the signing party identity is determined via the binary match value.

5. The system of claim 1, wherein the biometric sample includes a biometric access phrase, and wherein receiving the secret knowledge factor includes extracting the secret knowledge factor from the biometric access phrase.

6. The system of claim 1, wherein the decryption key is associated with the encryption key, and the decryption key is a symmetric decryption key generated using a Diffie-Hellman key agreement algorithm, and the encryption key is a symmetric encryption key generated using the Diffie-Hellman key agreement algorithm.

7. The system of claim 1, the instructions configured to further cause the authentication computing system to:

retrieve the secret knowledge factor from the biometric sample; and authenticate the signing party by matching the secret knowledge factor retrieved from the biometric sample with the biometric sample with the stored knowledge factor.

8. A method, comprising:

receiving, by a computing system, a signing party identifier and a biometric electronic signature authenticated key exchange ("BESAKE") token, the BESAKE token comprising a first biometric sample encrypted using an encryption key, the encryption key generated using a secret knowledge factor as an input to a password authenticated key exchange protocol and an object identifier, the signing party identifier associated with a signing party;

matching, by the computing system, the object identifier with a stored object identifier associated with the signing party identifier;

receiving, by the computing system, a second biometric sample captured from an authenticating party;

retrieving, by the computing system, a stored knowledge factor associated with the signing party identifier;

generating, by the computing system, a decryption key using the stored knowledge factor as an input to a password authenticated key exchange protocol;

decrypting, by the computing system, the encrypted first biometric sample from the BESAKE token using the decryption key to retrieve the first biometric sample; and verifying, by the computing system, the authenticating party is the signing party by matching the second biometric sample and the first biometric sample in the BESAKE token, wherein the object identifier is associated with a physical object used to capture the second biometric sample.

9. The method of claim 8, further comprising, generating, by the computing system, a second biometric reference template using the second biometric reference sample, wherein the authenticating party is verified as the signing party by matching the first biometric sample and the second biometric reference template.

10. The method of claim 9, wherein matching the first biometric sample and the second biometric reference template comprises:

transmitting to a biometric service provider computing system, a match request, the match request including the first biometric sample and the second biometric sample; and receiving from the biometric service provider computing system, a binary match value, the binary match value relating to a result, determined by the biometric service provider computing system, of matching the first biometric sample with the second biometric reference template associated with the second biometric sample;

wherein identity of the signing party is determined, by the computing system, via the binary match value.

11. The method of claim 8, further comprising, generating, by the computing system, a first biometric reference template using the first biometric reference sample, wherein the authenticating party is verified as the signing party by matching the second biometric sample and the first biometric reference template.

12. The method of claim 11, wherein matching the second biometric sample and the first biometric reference template comprises:

transmitting to a biometric service provider computing system, a match request, the match request including the first biometric sample and the second biometric sample; and receiving from the biometric service provider computing system, a binary match value, the binary match value relating to a result, determined by the biometric service provider computing system, of matching the second biometric sample with the first biometric reference template associated with the first biometric sample;

wherein identity of the signing party is determined, by the computing system, via the binary match value.

13. The method of claim 8, wherein the secret knowledge factor received during an enrollment procedure includes a plaintext password.

14. A method, comprising:

encrypting, by a computing system, a biometric sample captured from a signing party with an encryption key, the encryption key generated using a secret knowledge factor associated with a signing party as an input to a password authenticated key exchange protocol;

generating, by the computing system, a biometric electronic signature authenticated key exchange ("BESAKE") token including the encrypted biometric sample, an object identifier, and a signing party identifier associated with the secret knowledge factor;
matching the object identifier with a stored object identifier associated with the signing party identifier, wherein the object identifier is associated with a physical object used to capture the biometric sample.

15. The method of claim 14, wherein receiving the secret knowledge factor comprises extracting, by the computing system, the secret knowledge factor from the biometric sample.

16. The method of claim 14, further comprising, transmitting, by the computing system, a challenge response in the BESAKE token, wherein the challenge response requires a relying party to respond to the challenge response by sending a response message encrypted using a response key generated using the secret knowledge factor as an input to the password authenticated key exchange protocol.

\* \* \* \* \*